UNITED STATES PATENT OFFICE.

EDGAR G. FRISBIE, OF MONROE, MICHIGAN.

COMPOUND FOR LINING VESSELS.

SPECIFICATION forming part of Letters Patent No. 268,216, dated November 28, 1882.

Application filed September 13, 1882. (No specimens.)

*To all whom it may concern:*

Be it known that I, EDGAR G. FRISBIE, of Monroe, in the county of Monroe and State of Michigan, have invented a new and Improved Compound for Lining Vessels; and I do hereby declare that the following is a full, clear, and exact description of the same.

The object of the invention is to form, for coating the inside of vessels which are intended to contain butter, lard, oils, beer, wines, liquors, or mineral waters, a compound that will be insoluble by any of these liquids, and at the same time impermeable to fluids, so that the pail, barrel, box, tub, or other vessel shall be provided with a durable coating or lining impenetrable by air or water, and also to prepare wrapping-paper by the use of said compound to render it impermeable to water or grease, and so adapt it for wrapping butter, lard, meat, &c.

The compound which I have discovered by numerous experiments to be the best adapted for my purpose consists of shellac, beeswax, whiting, and alcohol. I first take the beeswax, slice it very thin, and boil it in alcohol. I then allow it to cool, and preferably repeat the process of boiling and cooling three times, when it is kept in an air-tight vessel until wanted for use. The whiting is mixed with alcohol and is ready for use after standing for twenty-four hours. I then employ, for every gallon of my compound, shellac, one pound; beeswax boiled in alcohol, one-half pound; whiting in alcohol, one-fourth pound; alcohol sufficient to make up the gallon.

The mixture may be applied to the vessel on the inside like any paint or liquid, and forms a coating or lining which I have found by actual experiment to be air-proof, water-proof, and insoluble in butter, lard, or any of the liquids specified.

I am aware that an enamel has been formed on the inside of casks by the application of successive coatings of gum-shellac and charcoal mixed with a large proportion of alcohol which requires to be burned or set fire to after the coatings have been applied. As I require no fire to form an enamel, I merely use the alcohol as a solvent and diluent, while the beeswax is mainly employed to give the lining an elasticity which makes the compound applicable to wood which shrinks and swells. This elasticity forms one of the chief and most valuable qualities of my compound.

Having thus described all that is necessary to a full understanding of my invention, what I claim as new is—

A compound for coating or lining the inside of vessels intended to contain butter, lard, oils, beer, wines, liquors, or mineral waters, and for preparing wrapping-paper to be used for wrapping meat, lard, butter, &c., consisting of shellac, beeswax, whiting, and alcohol, in about the proportions specified.

EDGAR G. FRISBIE.

Witnesses:
R. E. PHINNEY,
THOMAS PLUES.